United States Patent
Barbu et al.

(10) Patent No.: US 12,238,677 B2
(45) Date of Patent: Feb. 25, 2025

(54) ARRANGEMENT FOR DETERMINING A LOCATION OF A BASE STATION

(71) Applicant: Nokia Technologies Oy, Espoo (FI)

(72) Inventors: Oana-Elena Barbu, Aalborg (DK); Benny Vejlgaard, Gistrup (DK); Simon Svendsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 584 days.

(21) Appl. No.: 17/495,189

(22) Filed: Oct. 6, 2021

(65) Prior Publication Data

US 2022/0124668 A1   Apr. 21, 2022

(30) Foreign Application Priority Data

Oct. 19, 2020   (FI) ...................................... 20206030

(51) Int. Cl.
   *H04W 64/00*   (2009.01)
(52) U.S. Cl.
   CPC ....... *H04W 64/006* (2013.01); *H04W 64/003* (2013.01)
(58) Field of Classification Search
   CPC ............................ H04W 64/06; H04W 64/003
   See application file for complete search history.

(56) References Cited

U.S. PATENT DOCUMENTS

| | | |
|---|---|---|
| 2003/0022675 A1 | 1/2003 | Mergler |
| 2013/0121222 A1 | 5/2013 | Luo et al. |
| 2020/0182959 A1 | 6/2020 | Markhovsky et al. |
| 2021/0352609 A1* | 11/2021 | Kiefer ................. H04W 64/003 |
| 2021/0377905 A1* | 12/2021 | Chen ................. H04W 56/0045 |

FOREIGN PATENT DOCUMENTS

| | | |
|---|---|---|
| CN | 101032176 B | 1/2013 |
| CN | 103546865 A | 1/2014 |

OTHER PUBLICATIONS

"3rd Generation Partnership Project; Technical Specification Group Radio Access Network; NR; Physical layer procedures for data (Release 16)", 3GPP TS 38.214, V16.1.0, Mar. 2020, pp. 1-151.

"3rd Generation Partnership Project; Technical Specification Group Services and System Aspects; Service requirements for the 5G system; Stage 1 (Release 17)", 3GPP TS 22.261, V17.2.0, Mar. 2020, 83 pages.

"3rd Generation Partnership Project; Technical Specification Group Radio Access Network; Study on channel model for frequencies from 0.5 to 100 GHz (Release 16)", 3GPP TR 38.901, V16.1.0, Dec. 2019, pp. 1-101.

(Continued)

*Primary Examiner* — Justin Y Lee
(74) *Attorney, Agent, or Firm* — Brake Hughes Bellermann LLP

(57) ABSTRACT

An arrangement for determining a location of a base station by user equipment uses measurements of reference signals of a base station from different user equipment positions. The measurement results are preprocessed and then provided to a machine learning entity. The machine learning entity estimates the location of the base station and provides the estimated location for use in other functionality of the user equipment.

19 Claims, 4 Drawing Sheets

(56) References Cited

OTHER PUBLICATIONS

Niitsoo et al., "Convolutional Neural Networks for Position Estimation in TDoA-Based Locating Systems", International Conference on Indoor Positioning and Indoor Navigation (IPIN), Sep. 24-27, 2018, 8 pages.

Miseikis et al., "Multi-Objective Convolutional Neural Networks for Robot Localisation and 3D Position Estimation in 2D Camera Images", arXiv, May 30, 2018, 7 pages.

Niitsoo et al., "A Deep Learning Approach to Position Estimation from Channel Impulse Responses", Sensors, vol. 19, No. 5, 2019, pp. 1-23.

"Using GNSS Raw Measurements on Android Devices", European GNSS Agency, 2017, pp. 1-47.

Office action received for corresponding Finnish U.S. Appl. No. 20/206,030, dated Jan. 21, 2021, 11 pages.

"Discussion on potential positioning enhancements", 3GPP TSG RAN WG1 #103-e, R1-2007666, Agenda: 8.5.3, vivo, Oct. 26-Nov. 13, 2020, 49 pages.

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.2.0, Sep. 2020, pp. 1-117.

"Evaluation of NR positioning performance", 3GPP TSG RAN WG1 #103-e, R1-2007665, Agenda: 8.5.2, vivo, Oct. 26-Nov. 13, 2020, 76 pages.

"Potential Positioning Enhancements for NR Rel-17 Positioning", 3GPP TSG RAN WG1 #103-e, R1-2008619, Agenda: 8.5.3, Qualcomm Incorporated, Oct. 26-Nov. 13, 2020, pp. 1-17.

* cited by examiner

ARRANGEMENT FOR DETERMINING A LOCATION OF A BASE STATION

DESCRIPTION OF BACKGROUND

The following disclosure relates to wireless communication systems. More specifically the following disclosure relates to detecting the location of a base station by a user equipment.

Modern wireless communication systems are complicated and involve using multiple antennas or antenna arrays. These antennas are often using high frequencies and they are covering areas using beams. Furthermore, often these antennas are in base stations that have small coverage. Thus, a plurality of base stations is used for providing good quality of service. Furthermore, locations of the base station and the mobile device communicating with the base station are sensitive to the quality of the service. A small difference between these two may change, for example, the visibility between these two or cause interference that reduces the quality of the service.

Many functions in a mobile communication network are depending on measurements on various reference signals. These signals are transmitted by base stations and are used for determining a need for functionality such as handover, beam switching, positioning measurements and location estimation. The user equipment may hear several different base stations operating possibly on different frequencies so that there is overlapping coverage. The reference signals from these base stations are measured so that the decisions on the network current network configuration can be made. For example, a decision to perform a handover from current base station or beam to a better one may be launched based on the information derived from the measured reference signals.

Measuring reference signals from all hearable base stations is a demanding task. The user equipment scans all available options and process the made measurements. Often the measured reference signals are transmitted from base stations that are not used in communications for several possible reasons. For example, a measured base station may located so that it will not be used, different frequency is preferred at that moment or there are other more closely located base station. Avoiding these unnecessary measurements would improve the overall efficiency of the mobile communication network and also reduce processing at user equipment.

SUMMARY

An arrangement for determining a location of a base station by user equipment uses measurements of reference signals of a base station from different user equipment positions. The measurement results are preprocessed and then provided to a machine learning entity. The machine learning entity estimates the location of the base station and provides the estimated location for use in other functionality of the user equipment.

In an aspect a user equipment is disclosed. The user equipment comprises at least one processor; and at least one memory including computer program code, the at least one memory and the computer program code being configured to, with the at least one processor, cause the user equipment to: measure at least three reference signals between the user equipment and a base station; measure the position of the user equipment for the measurements of the at least three reference signals; record a time stamp for the at least three measurements; provide the at least three measured reference signals, user equipment positions and time stamps to a machine learning entity; and receive the location of the base station provided by the machine learning entity. It is beneficial to determine a location of a base station so that the user equipment can decide if the base station needs to be considered when deciding, for example, the possibility of handover or beam switching. When the location is known the base station that need not to be considered may be ignored.

In an example implementation the at least one memory and the computer program code is further configured to, with the at least one processor, cause the user equipment to: measure at least one alternative position of the user equipment; and associate the at least one alternative position and an estimate of trust. It is beneficial to measure alternative positions for the user equipment as it improves the accuracy of the location estimates of surrounding base stations.

In an example implementation the at least one memory and the computer program code is further configured to, with the at least one processor, cause the user equipment to: determine difference of locations between consecutive measurements; and discard a measurement when the difference does not fulfil the predetermined minimum difference. It is beneficial to determine a minimum difference between measuring locations because too closely situated measurements may be correlated and a minimum distance reduces correlation.

In an example implementation the at least one memory and the computer program code is further configured to, with the at least one processor, cause the user equipment to measure at least one of the following: the speed of user equipment and the direction of movement. It is beneficial to measure the speed and the direction of the movement as it can be used for determining the required minimum distance.

In an example implementation the at least one memory and the computer program code is further configured to, with the at least one processor, cause the user equipment to remove incomplete and erroneous measurements in the at least three measured reference signals, user equipment positions and time stamps. It is beneficial to remove the incomplete and erroneous measurement entries as they cannot be used in determining the correct result.

In an example implementation the at least one memory and the computer program code is further configured to, with the at least one processor, cause the user equipment identify the base station in the at least three measured reference signals, user equipment positions and time stamps. It is beneficial to identify base station in the measurements so that the measurement input can be easily processed and is able to handle a plurality of base stations.

In an example implementation the at least one memory and the computer program code is further configured to, with the at least one processor, cause the user equipment to select from the at least three measured reference signals, user equipment positions and time stamps comprising an identified base station corresponding with identification of the base station. It is beneficial to use the identification in selecting the input provided to the machine learning entity.

In an example implementation the at least one memory and the computer program code is further configured to, with the at least one processor, cause the user equipment to clean signals associated with the selection by removing noise and co-channel interference. It is beneficial to remove the noise and to compensate co-channel interference that is caused by poor synchronization between base stations. This increases the accuracy of determining of location estimates of surrounding base stations.

In an example implementation removing noise and co-channel interference is performed using one of the following: an autoencoder or deep convolutional neural network.

In an example implementation the at least one memory and the computer program code is further configured to, with the at least one processor, cause the user equipment to estimate the location of the base station based on the cleaned signals.

In an example implementation the at least one memory and the computer program code is further configured to, with the at least one processor, cause the user equipment to compute a probability of the line of sight between the user equipment and the base station. It is beneficial to compute the probability of the line of sight as it provides to the user equipment an indication of how likely it is that a direct path may be obstructed, and thus impact how the user equipment will process/prioritize the respective measurement in the overall localization.

In an example implementation the at least one memory and the computer program code is further configured to, with the at least one processor, cause the user equipment to compare the standard deviation for the position estimate of a base station to a predefined threshold; and determine a need for retraining when the threshold is exceeded. It is beneficial to determine when the arrangement needs retraining. This provides better results during the normal use of the arrangement.

In an example implementation when measuring the reference signals the at least one memory and the computer program code is further configured to, with the at least one processor, cause the user equipment to collect and process reference signal samples.

In an aspect a method is disclosed. The method is suitable for determining a location of a base station. The method comprises: measuring at least three reference signals between the user equipment and a base station; measuring the position of the user equipment for the measurements of the at least three reference signals; recording a time stamp for the at least three measurements; providing the at least three measured reference signals, user equipment positions and time stamps to a machine learning entity; and receiving the location of the base station provided by the machine learning entity.

In an aspect a computer program product is disclosed. The computer program product comprises computer program code, wherein the computer program code is configured to cause performing a method as disclosed above, when the computer program code is executed by a computing device.

The above described arrangement and method for determining a location of a base station provide a possibility to use the exact location of a base station in mobile communication network functionality at the user equipment. For example, the user equipment may select relevant set of settings and filter what actions and measurements should the user equipment perform. For example, the user equipment may use the base station locations to adjusts its own receive beam pattern without the need for an exhaustive beam search as in the standard approach. The user equipment may trigger proactively a handover procedure before the quality of the signal reaches the handover alert threshold. If the user equipment knows where the current best base stations are located, and by predicting its own future location, the user equipment may trigger a handover request before the quality of its link degrades beyond repair. The user equipment may use the base station locations to update its own position via cellular positioning procedures, for example, when satellite-based is not available.

BRIEF DESCRIPTION OF THE DRAWINGS

The accompanying drawings, which are included to provide a further understanding of the determining a location of a base station by user equipment and constitute a part of this specification, illustrate examples and together with the description help to explain the principles of determining a location of a base station by user equipment. In the drawings.

DETAILED DESCRIPTION

Reference will now be made in detail to the example embodiments, examples of which are illustrated in the accompanying drawings.

Figure 1:
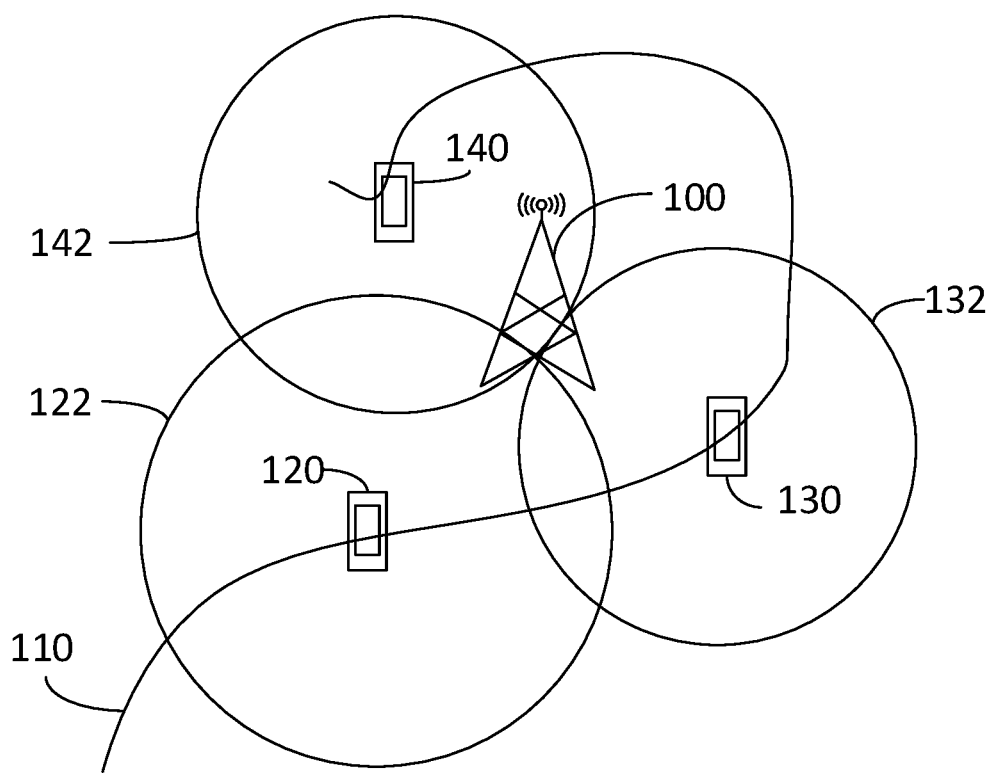
FIG. 1 is an example illustration explaining the basic principles of an arrangement for determining a location of a base station.

FIG. 1 is an example illustration explaining the basic principles of an arrangement for determining a location of a base station. In the example of FIG. 1 a mobile device, mobile phone, or any other user equipment, such as a tablet computer, laptop computer, data communication module of a car, an IoT-device or similar, is moving along a path 110. The mobile phone is communicating with a base station 100. The base station may be, for example, an eNB of a 4G network, gNB of a 5G or a similar mobile communication network.

In the example of FIG. 1 the mobile phone is shown in three different positions 120, 130, 140. Thus, in the example of FIG. 1 the mobile phone is moving. In each position a circle 122, 132, 142 is surrounding the mobile phone. The circle is representing the distance between the mobile phone and the base station 100. Thus, it also represents a possible location of a base station.

In the example of FIG. 1 three positions are shown as it is the minimum number required for determining a position as in traditional triangulation and multilateration methods. However, the conventional methods have several drawbacks. For example, the reliability decreases rapidly when there is no line of sight. Furthermore, they require tight synchronization and are sensitive to noise and nonlinearities. In the example of FIG. 1 the minimum number of three is used for the sake of clarity. It is possible to use more than three positions.

Figure 2:
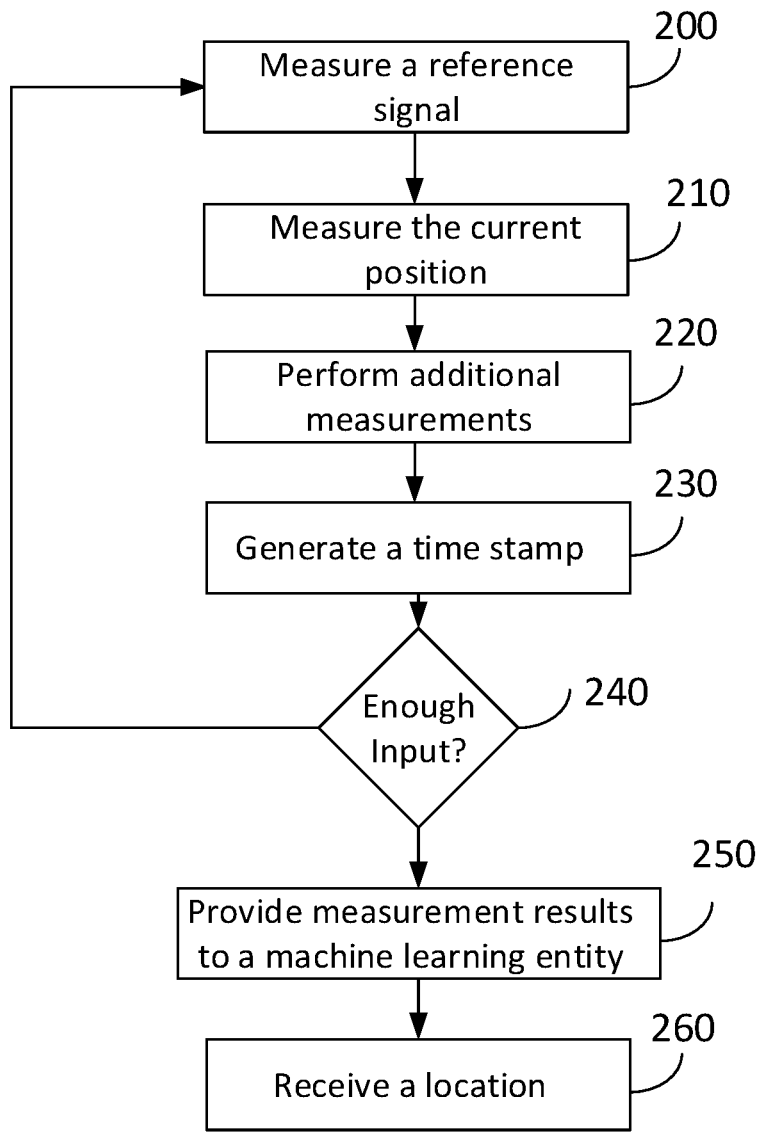
FIG. 2 is an example of a method for determining a location of a base station.

FIG. 2 discloses an example of a method for determining a location of a base station. In the method first a reference signal is measured, step 200. The measurement of a reference signal means in this context collecting and processing signal samples. The measurement of a reference signal is a common procedure in mobile communication networks and used for several purposes. In the example of FIG. 2 the reference signal is measured in order to determine the distance from the mobile phone to the base station as illustrated in the example of FIG. 1.

Then the current position of the user equipment, or other similar device, is measured, step 210. The measuring of current position may involve using more than one positioning system. For example, the main positioning systems may be a satellite-based navigation system that is common in modern mobile devices and WiFi-based positioning system. These two are mentioned only as common examples and also others, such as Bluetooth or other user equipment based positioning may be used. The position measurement includes a trust metric that is typically received from the positioning device used. This may be, for example, the variance of the position estimate.

Even if the measurements in steps 200 and 210 are shown in a specific order in FIG. 2 these measurements may be done in different order and may be done essentially at the same time. The user equipment may perform additional measurements, such as the speed of the user equipment and the direction of the movement, step 220. All measurements performed are then time stamped, step 230. The measurements are stored as a record, row in a table or a similar dataset that includes the time stamp.

After collecting measurement results it is determined if the input is already sufficient, step 240. The determination of the sufficiency may be a simple calculation of the number of the measurements. When the number is three or more, the number of measurements is sufficient. However, the determination may consider also the quality of the measurements. It is desired that the measurements are done in different positions. Thus, it is desired that the measuring user equipment moves enough between the measurements. This may be done by comparing the coordinates or determining from the time stamps and recorded speed of the user equipment. If the input is not sufficient the method returns to step 200. If the input is sufficient, it is fed to a machine learning entity, step 250. Finally, a location of the base station is received, step 260.

In the above an example of a method for generating input was disclosed in steps 200-230. An example of a such input is shown in the following table.

TABLE 1

| Input measurement table | | | | | | | | |
|---|---|---|---|---|---|---|---|---|
| Timestamp | NR RS samples | Alternative position 1 | Trust 1 | ... | Alternative position Z | Trust Z | mask | UE speed | UE DOM |

In the table a field for mask is shown. The mask is a related to the alternative positions, for example, as follows. The User Equipment generates a binary vector of length Z, where the first entry of 0 indicates that the first alternative position estimate is missing, and 1 otherwise. For example, the user equipment can obtain three different alternative position estimates: 1) GNSS, 2) WiFi and 3) UE2UE. If the user equipment has a measurement in which it acquired only GNSS, then the mask for this measurement is mask=[1 0 0].

Figure 3:
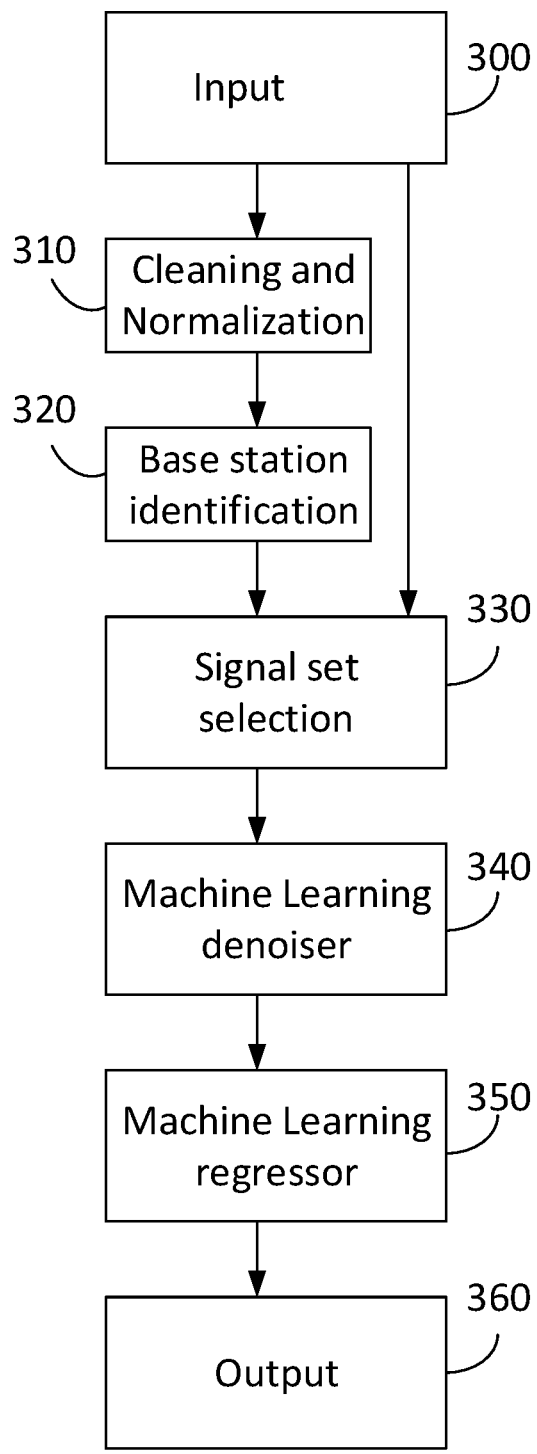
FIG. 3 is an example of a block diagram of an arrangement for determining a location of the base station.

In FIG. 3 an example of a block diagram of the machine learning architecture is shown. In the example of FIG. 3 a 5G user equipment is used. In the example first the input table 300 comprising the earlier collected input is shown. In the example of FIG. 3 the table is similar to table 1 shown above.

The field "NR RS samples" is used to identify base stations which the user equipment hears. This may be done using cross-correlation products and is performed after the input table is cleaned and normalized at block 310. The cleaning process is used for removing missing and erratic values so that the input table can be used as an input for the machine learning blocks. The block 320 "base station identification" in FIG. 3 outputs a set of samples for each base station ID. The set is obtained as the cross-correlation between the received signal and a local sequence. In the following the set is referred as gNB x as RxSig(x). Then, the block 330 "Signal set selection" acts as a filter and outputs RxSig(x) and the entries of Table 1 corresponding to the NR RS samples containing signals from gNB x. This selection ensures that the effects of co-channel interference are captured in the output dataset. This is achieved through the selection of a subset of entries in table 1.

Next, these signals RxSig and cropped Table 1, that are received from signal set selection block 330 are fed to a machine learning denoiser block 340 which cleans the signal of gNB x from noise and co-channel interference. The co-channel interference may be the result of timing offsets occurring due to poor synchronization between gNBs, and it is compensated for during this phase. This block 340 can be implemented as an autoencoder, deep convolutional neural network (CNN), etc and outputs CleanedRxSig.

The cleaned signal is provided with the corresponding entries of table 1 to a machine learning regressor block 350. The regressor block may be implemented as a deep neural network. The deep neural network may comprise a cost function defined as a mean squared error between the true and estimated positions. The regressor block 350 provides an output table 360. An example of such output table is shown in table 2 below.

TABLE 2

| output | | | |
|---|---|---|---|
| Timestamp | gNB ID | Position mean | Position variance |

In the table shown above a location for a particular base station is shown. The table may contain more than one base station. The time stamp tells the age of the measurement.

The table may be used for several purposes, wherein it is beneficial to know locations of one or more base station. The information may be used in triggering a handover, performing an intra-cell and/or inter-cell handover, performing positioning measurements for user equipment assisted positioning and performing location estimation for user equipment based positioning. In the examples mentioned, and other similar tasks, it is beneficial to know locations of base station so that only relevant base stations are measured and considered for further actions. Based on that information the user equipment may, for example, perform a handover, beam switch or similar. For example, use the base station locations to adjusts its own receive beam pattern without the need for an exhaustive beam search as in the standard approach. Furthermore, the user equipment may trigger proactively a handover procedure before the quality of the signal reaches the handover alert threshold. Specifically, if the user equipment knows where the current best K base stations are located, and by predicting its own future location, the user equipment may trigger a handover request before the quality of its link degrades beyond repair. Additionally, the user equipment may use the base station locations to update its own position via cellular positioning procedures when satellite-based positioning is not possible, for example, in indoor environment.

Figure 4:
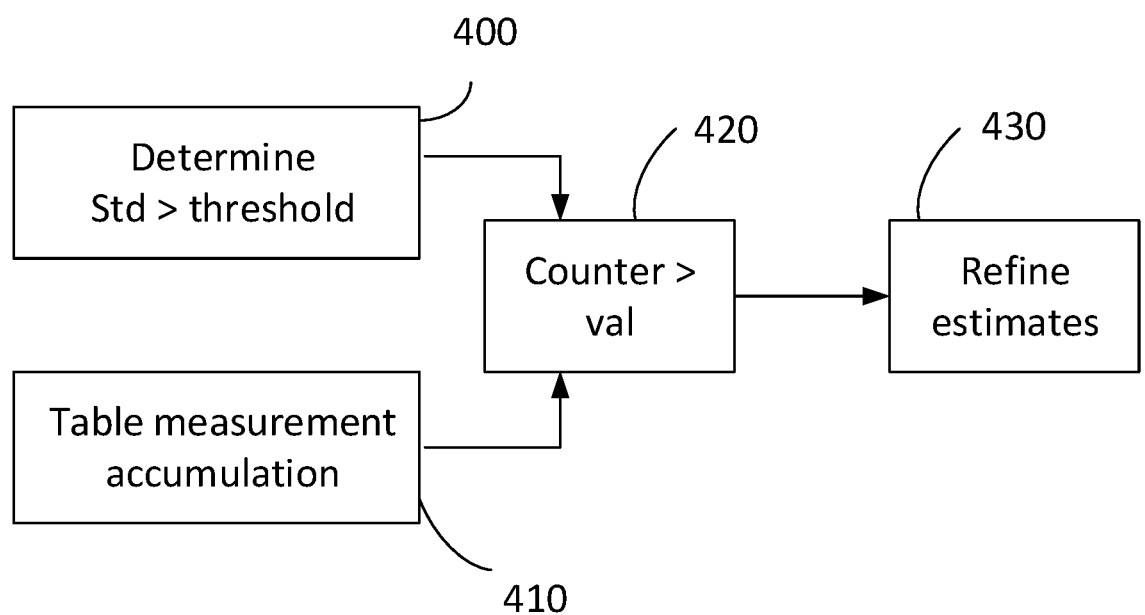
FIG. 4 is an example of a block diagram of an arrangement for determining a need for retraining of an arrangement for determining a location of the base station.

In FIG. 4 an example of an arrangement for positioning refinement is shown. The refinement process may be additional training or complete retraining of the machine learning entities. The refinement process as shown in the example of FIG. 4 may be launched by an internal or external message. It may be applied to some or all already estimated base station locations. In an example, a local trigger may consist of the following: if the standard deviation for the position estimate of a base station is larger than a predefined threshold, step 400, the user equipment may decide step 420 to re-estimate, step 430, once enough new measurements are collected to a measurement table, step 410, for the problematic base station. The re-estimation 430 may be, as explained above, partial or complete retraining of one or more machine learning entities in the arrangement. Another way to determine a need for retraining is to monitor the handovers, beam switching and other activity. When the process is not accurate the number of handovers, beam switching and similar increases because changes back are more probable. When the number of changes back is higher than it should be the retraining process may be applied.

The machine learning based approach can be trained as explained in the following. The training may be done in an artificially generated environment. The artificially generated environment, such as a laboratory, may involve using ray tracing or by logging measurements for which the detectable base station locations are known. Once deployed, the architecture can be retrained in the field.

One method for retraining is to do it with network support. The network sends lists of base station locations for a predetermined training period. The exact locations may be used in training.

In another method the retraining is done autonomously at the user equipment, by using the past estimated base station locations as new training data. Specifically, the user equipment may use a semi-supervised learning approach in which it estimates and stores base station locations to be used for own radio resource management purposes. If the radio resource management performed using these estimates is successful, e.g. successful soft handover, then the user equipment tags these estimates as valid and includes them into the existing training data. Once sufficiently self-validated training data have been collected, the user equipment triggers the re-training.

In a third method a combination of the above two methods is used. In the third method the user equipment collects training data both from the network and by self-validating past base station location estimates.

As stated above, the components of the exemplary embodiments can include a computer readable medium or memories for holding instructions programmed according to the teachings of the present inventions and for holding data structures, tables, records, and/or other data described herein. A computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

As used in this application, the base station and/or user equipment may comprise a circuitry. The term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions and
  (c) hardware circuit(s) and/or processor(s), such as microprocessor(s) or a portion of microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

An example of an access architecture that may be applied may be e.g. a radio access architecture based on long term evolution advanced (LTE Advanced, LTE-A) or new radio (NR, 5G), without restricting, however, the example embodiments to such an architecture. It is obvious for a person skilled in the art that the example embodiments may also be applied to other kinds of communications networks having suitable means by adjusting parameters and procedures appropriately.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

It is obvious to a person skilled in the art that with the advancement of technology, the basic idea of determining a location of a base station by user equipment may be implemented in various ways, determining a location of a base station by user equipment and its example embodiments are thus not limited to the examples described above; instead they may vary within the scope of the claims.

The invention claimed is:

1. A user equipment comprising:
at least one processor; and
at least one memory including computer program code, the at least one memory and the computer program code being configured to, with the at least one processor, cause the user equipment to:
measure at least three reference signals received from a base station;
measure respective positions of the user equipment associated with the measurements of the at least three reference signals;
record respective time stamps for the at least three measurements;
provide the at least three measured reference signals, the respective positions of the user equipment and the respective time stamps to a machine learning entity; and
receive an estimation of a location of the base station provided by the machine learning entity; and
identify the base station in at least one of the at least three measured reference signals, user equipment positions or time stamps.

2. The user equipment according to claim 1, wherein the at least one memory and the computer program code are further configured to, with the at least one processor, cause the user equipment to:
measure at least one alternative different position of the user equipment; and
associate the at least one alternative different position and an estimate of trust.

3. The user equipment according to claim 1, wherein the at least one memory and the computer program code are further configured to, with the at least one processor, cause the user equipment to:
determine difference of locations between consecutive position measurements; and
discard a position measurement when the difference does not fulfil a minimum difference.

4. The user equipment according to claim 1, wherein the at least one memory and the computer program code are further configured to, with the at least one processor, cause the user equipment to measure at least one of a speed of the user equipment or a direction of a movement of the user equipment.

5. The user equipment according to claim 1, wherein the at least one memory and the computer program code are further configured to, with the at least one processor, cause the user equipment to remove incomplete and erroneous measurements in at least one of the at least three measured reference signals, user equipment positions or time stamps.

6. The user equipment according to claim 1, wherein the at least one memory and the computer program code are further configured to, with the at least one processor, cause the user equipment to select a subset of entries from at least one of the at least three measured reference signals, user equipment positions or time stamps, wherein each entry comprises an identified base station corresponding with identification of the base station.

7. The user equipment according to claim 6, wherein the at least one memory and the computer program code are further configured to, with the at least one processor, cause the user equipment to clean signals associated with the selection by removing noise and co-channel interference.

8. The user equipment according to claim 7, wherein removing the noise and co-channel interference is performed using at least one of: an autoencoder or deep convolutional neural network.

9. The user equipment according to claim 7, wherein the at least one memory and the computer program code are further configured to, with the at least one processor, cause the user equipment to estimate the location of the base station based on the cleaned signals.

10. The user equipment according to claim 9, wherein the at least one memory and the computer program code are further configured to, with the at least one processor, cause the user equipment to compute a probability of a line of sight between the user equipment and the base station.

11. The user equipment according to claim 1, wherein the at least one memory and the computer program code are further configured to, with the at least one processor, cause the user equipment to compare a standard deviation for the position estimate of the base station to a threshold; and determine a need for retraining in response to the threshold being exceeded.

12. The user equipment according to claim 1, wherein measuring the reference signals comprises collecting and processing reference signal samples.

13. The user equipment according to claim 1, wherein the measuring the position of the user equipment is performed using one or more positioning systems.

14. A method comprising:
measuring, by a user equipment, at least three reference signals received from a base station;
measuring, by the user equipment, respective positions of the user equipment associated with the measurements of the at least three reference signals;
recording, by the user equipment, respective time stamps for the at least three measurements;
providing, by the user equipment, the at least three measured reference signals, the respective positions of the user equipment and the respective time stamps to a machine learning entity;
receiving, by the user equipment, an estimation of a location of the base station provided by the machine learning entity; and
identifying the base station in at least one of the at least three measured reference signals, user equipment positions or time stamps.

15. The method according to claim 14 further comprising:
measuring, by the user equipment, at least one alternative different position of the user equipment; and
associating, by the user equipment, the at least one alternative different position and an estimate of trust.

16. The method according to claim 14 further comprising:
determining, by the user equipment, difference of locations between consecutive position measurements; and
discarding, by the user equipment, a position measurement when the difference does not fulfil a minimum difference.

17. The method according to claim 14 further comprising: measuring, by the user equipment, at least one of a speed of the user equipment or a direction of a movement of the user equipment.

18. The method according to claim 14 further comprising:
removing, by the user equipment, incomplete and erroneous measurements in at least one of the at least three measured reference signals, user equipment positions or time stamps.

19. A user equipment comprising:
at least one processor; and at least one memory including computer program code, the at least one memory and the computer program code being configured to, with the at least one processor, cause the user equipment to:
   measure at least three reference signals received from a base station;
   measure respective positions of the user equipment associated with the measurements of the at least three reference signals;
   record respective time stamps for the at least three measurements;
   provide the at least three measured reference signals, the respective positions of the user equipment and the respective time stamps to a machine learning entity;
   receive an estimation of a location of the base station provided by the machine learning entity; and
   measure at least one of a speed of the user equipment or a direction of a movement of the user equipment.

* * * * *